Figure 2:
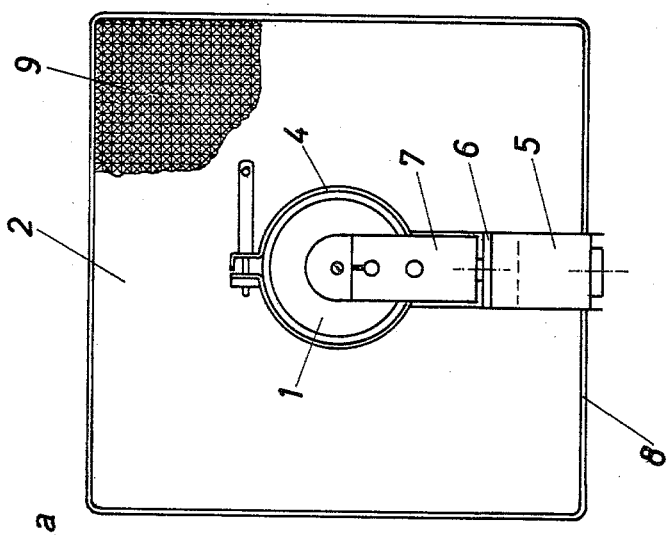

May 25, 1965   W. LUDLOFF   3,185,828

PHOTOGRAPHIC FLASHLIGHT ILLUMINATION

Filed Jan. 7, 1963   2 Sheets-Sheet 1

Wolfgang Ludloff
INVENTOR.

BY
Darbo, Robertson &
Vandenburgh

Wolfgang Ludloff
INVENTOR.

BY
Darbo, Robertson &
Vandenburgh

3,185,828
PHOTOGRAPHIC FLASHLIGHT ILLUMINATION
Wolfgang Ludloff, Porz-Westhoven, Germany, assignor to Gesellschaft für Multiblitz-Gerate, Dr.-Ing. D.A. Mannesmann m.b.H., Porz-Westhoven, Germany
Filed Jan. 7, 1963, Ser. No. 249,958
Claims priority, application Germany, Jan. 5, 1962, G 33,955
4 Claims. (Cl. 240—1.3)

This invention relates to an illumination device for photographic purposes, in particular to an electronic flashlight apparatus, comprising a light source arranged in a specular reflector and a scattering plate provided with light-scattering means. Commonly such photographic lamps produce a high-contrast light with marked casting of shadows in spite of the scattering plate arranged immediately in front of the reflector. For many purposes, however, a low-contrast illumination with brightened shadows is required. Prior art low-contrast lamps are designed in such a manner that the light emanating from the reflector is cast onto a white diffusedly reflecting surface and the object to be photographed is illuminated indirectly. Such low-contrast lamps with indirect illumination suffer from a large loss of light energy which in particular with electronic flashlight apparatus requires a very high expenditure.

This invention has for its object to achieve a low-contrast lamp effect with direct illumination and while avoiding high losses of light energy. In order to achieve this object, it is necessary to make direct light emanate from a large area with uniform distribution lamp units whereas a plurality of closely adjacent relatively small photographic lamps illuminate the object to be photographed directly require large expenditure and in spite of this produce only an insufficient low-contrast effect. Also directing direct light to the object through large plates of frosted glass will not lead to a success. Also then a large loss of light energy occurs due to strong reflection by the plate aside from the fact that such a plate will not radiate the light uniformly, but with trans-illumination will have a bright spot in the centre and will remain relatively dark in the marginal portions.

According to this invention the object to achieve a low-contrast effect with a photographic lamp by direct illumination is attained by affixing a conical tubus to the light emission opening of the reflector, the tubus having a length of a multiple of the reflector depth, and by providing a scattering plate covering the light emission opening of the tubus with light scattering means comprising small beam splitting elements in the form of pyramidal prisms regularly distributed over the whole surface. With a sufficiently large distance of a scattering plate provided with pyramidal prisms from the light source and the reflector surface reflecting the light source, the light source is virtually quadrupled by each of the beam splitting prism elements. It has been found that thereby the prism scattering plate appears as a uniformly transilluminated surface within a certain angle of emission. The light yield can be further improved by making the inner surface of the tubus specularly reflecting.

Advantageously the light emission opening of the tubus covered by the scattering plate is defined by straight edges and is preferably of square shape. Low contrast lamps may then be assembled to large radiating surfaces or walls and a low contrast effect may be attained which up to now has not been attainable with reasonable expenditure, in particular if electronic flashtubes have been used.

Figure 1:
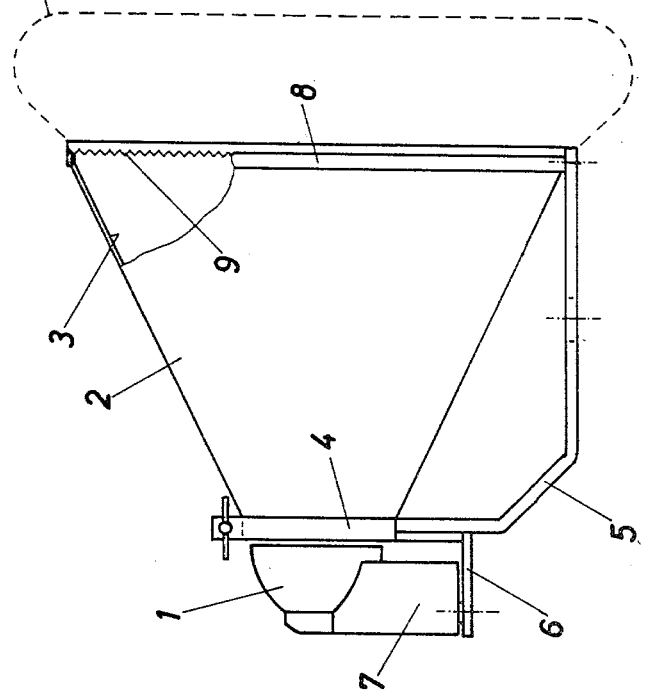
Figure 3:
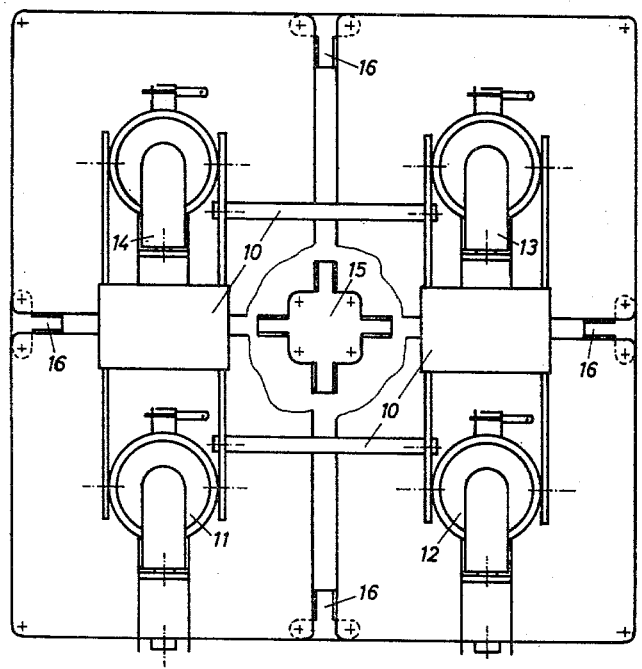

As an embodiment of this invention a low-contrast lamp is shown in FIGS. 1 and 2 in different views. FIG. 3 shows an illumination unit composed of four low-contrast-lamps.

A long conical tubus 2 whose inner surfaces 3 are specularly reflecting is affixed to the light emission opening of a specular reflector 1 which encloses a light source in the form of an electronic flash tube, not shown. The length of the tubus 2 is a multiple of the depth of the reflector 1. The tubus 2 is affixed to a yoke 5 by means of a clamp 4. The yoke 5 engages the front edge of the tubus 2. The yoke 5 is provided wtih a bracket 6, to which the electronic flashlight apparatus 7 pertaining to the reflector 1 is affixed. The square front opening of the tubus 2 is covered with a scattering plate 8 of transparent plastic material, which is provided with light scattering means comprising small pyramidal prisms uniformly distributed all over the whole inner surface. With this device, the curve of light distribution shown in dashed lines at $a$ is obtained from which it can be seen that within a certain angle of emission the scattering plate 8 appears as a uniformly transilluminated surface which is so large that a low contrast lamp effect is achieved.

Due to the square shape of the scattering plate 8 it is possible to assemble, for example, four of these low contrast lamps in the manner shown in FIG. 3, in order to thereby obtain a large continuous surface by which the object to be photographed is illuminated in direct light.

The assembly is effected in such way that four flashlight apparatus 11, 12, 13, 14 each having a tubus affixed thereto are mounted in the corners of a square so that two straight edges of the respective scattering plate 8 are positioned closely adjacent. In the centre the four scattering plates are connected to each other by a cross-shaped sheet metal element 15. At their outer edges connecting sheet metal elements 16 are provided between adjacent scattering plates.

I claim:
1. In a photographic flashlight having a specular reflector and a light source arranged therein, in combination, a conical tubus diverging from the reflector and having a length several times the depth of the reflector, and a light scattering plate arranged transversely at the large end of the tubus, said plate having light scattering means comprising a plurality of pyramidal prisms distributed uniformly throughout and covering the inner surface thereof.

2. Apparatus in accordance with claim 1 wherein the inner surface of the tubus is specularly reflecting.

3. Apparatus in accordance with claim 1 wherein the outer end of the tubus is square in cross-section and the light scattering plate is square.

4. Photographic flashlight apparatus comprising a plurality of flashlight units as defined in claim 3 arranged with the light scattering plates thereof contiguous and in a single plane.

References Cited by the Examiner
UNITED STATES PATENTS

| | | | |
|---|---|---|---|
| 1,765,957 | 6/30 | Westphalen | 240—1.3 |
| 2,237,815 | 4/41 | Fulton | 240—46.53 |
| 2,295,863 | 9/42 | Paradis | 240—3 X |
| 2,327,818 | 8/43 | Peterson | 240—1.3 X |
| 2,768,284 | 10/56 | Wooley | 240—1.3 X |
| 2,953,675 | 9/60 | Kluge | 240—1.3 |
| 2,985,062 | 5/61 | Clapp | 88—24 |

NORTON ANSHER, *Primary Examiner.*